(12) United States Patent
Katayama et al.

(10) Patent No.: US 8,822,082 B2
(45) Date of Patent: Sep. 2, 2014

(54) SEPARATOR FOR ELECTROCHEMICAL DEVICE, ELECTRODE FOR ELECTROCHEMICAL DEVICE, AND ELECTROCHEMICAL DEVICE

(75) Inventors: Hideaki Katayama, Osaka (JP); Yoshinori Sato, Osaka (JP); Toshihiro Abe, Osaka (JP); Nobuaki Matsumoto, Osaka (JP)

(73) Assignee: Hitachi Maxwell, Ltd., Ibaraki-Shi, Osaka (JP)

( * ) Notice: Subject to any disclaimer, the term of this patent is extended or adjusted under 35 U.S.C. 154(b) by 966 days.

(21) Appl. No.: 12/528,779

(22) PCT Filed: Mar. 14, 2008

(86) PCT No.: PCT/JP2008/054751
§ 371 (c)(1),
(2), (4) Date: Aug. 26, 2009

(87) PCT Pub. No.: WO2008/114727
PCT Pub. Date: Sep. 25, 2008

(65) Prior Publication Data
US 2010/0015530 A1    Jan. 21, 2010

(30) Foreign Application Priority Data
Mar. 15, 2007    (JP) ................................ 2007-066070

(51) Int. Cl.
*H01M 2/16*    (2006.01)
*H01G 9/02*    (2006.01)
*H01M 10/0525*    (2010.01)
*H01G 9/00*    (2006.01)

(52) U.S. Cl.
CPC .......... *H01M 2/166* (2013.01); *H01M 10/0525* (2013.01); *H01G 9/155* (2013.01); *H01G 9/02* (2013.01); *Y02E 60/12* (2013.01)
USPC ............................ 429/251; 429/247; 429/249

(58) Field of Classification Search
USPC .................................................. 429/246–255
See application file for complete search history.

(56) References Cited

U.S. PATENT DOCUMENTS

| | | | |
|---|---|---|---|
| 6,632,561 B1 * | 10/2003 | Bauer et al. .................... | 429/144 |
| 2003/0044348 A1 * | 3/2003 | Sato et al. ...................... | 423/626 |
| 2003/0052047 A1 * | 3/2003 | Pinnavaia et al. ............. | 208/297 |
| 2006/0024569 A1 | 2/2006 | Hennige et al. | |
| 2006/0105245 A1 | 5/2006 | Ikuta et al. | |
| 2006/0134526 A1 | 6/2006 | Han et al. | |
| 2006/0263693 A1 | 11/2006 | Kim et al. | |
| 2007/0254983 A1 * | 11/2007 | Lapra ............................ | 523/200 |
| 2007/0264577 A1 * | 11/2007 | Katayama et al. ............. | 429/246 |
| 2010/0033138 A1 * | 2/2010 | Alger et al. .................... | 320/153 |

FOREIGN PATENT DOCUMENTS

| | | |
|---|---|---|
| JP | 11-40132 A | 2/1999 |
| JP | 2003-2642 A | 1/2003 |
| JP | 2005-536857 A | 12/2005 |
| JP | 2006-147569 A | 6/2006 |
| JP | 2006-310302 A | 11/2006 |
| JP | 2008-123996 A | 5/2008 |
| WO | WO-2005/124899 A1 | 12/2005 |
| WO | WO-2006/062153 A1 | 6/2006 |

* cited by examiner

*Primary Examiner* — Muhammad Siddiquee
(74) *Attorney, Agent, or Firm* — Birch, Stewart, Kolasch & Birch, LLP

(57) ABSTRACT

A separator for an electrochemical device of the present invention includes a porous film including: a filler; an organic binder; and at least one resin selected from resin A that has a melting point of 80 to 140° C. and resin B that absorbs a non-aqueous electrolyte and swells upon heating and whose swelling degree increases with increasing temperature, and the filler contains boehmite having a secondary particle structure in which primary particles are connected.

18 Claims, 1 Drawing Sheet

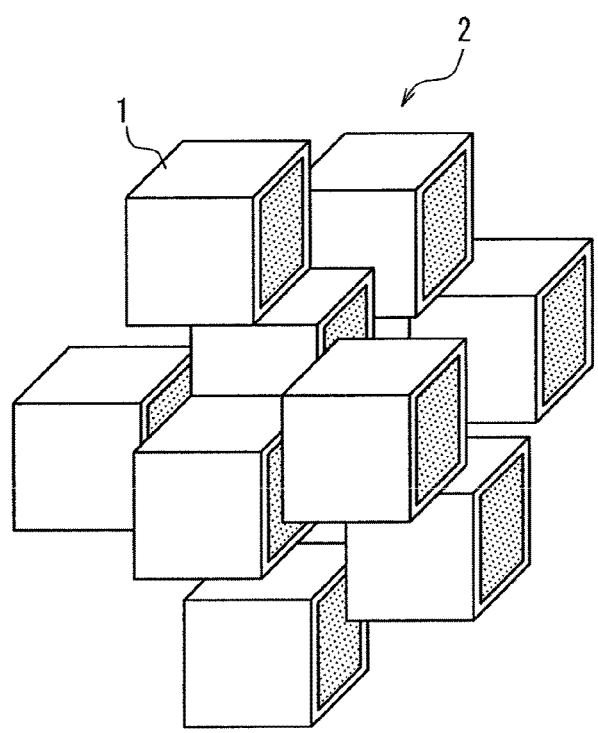

SEPARATOR FOR ELECTROCHEMICAL DEVICE, ELECTRODE FOR ELECTROCHEMICAL DEVICE, AND ELECTROCHEMICAL DEVICE

TECHNICAL FIELD

The present invention relates to a separator for an electrochemical device that is inexpensive and has superior dimensional stability at high temperatures, an electrode for an electrochemical device that includes such a separator, and an electrochemical device that is safe even in a high temperature environment.

BACKGROUND ART

Electrochemical devices that employ non-aqueous electrolytes, as typified by lithium secondary batteries and supereapacitors, have a high energy density, and thus are widely used as a power source for portable devices such as mobile phones and notebook computers. With the trend toward higher performance portable devices, electrochemical devices tend to increase in capacity, and therefore, ensuring safety is becoming an important issue.

A currently available lithium secondary battery employs, as a separator interposed between a positive electrode and a negative electrode, for example, a polyolefin porous film having a thickness of approximately 20 to 30 µm. In order to secure what is called a shutdown effect that improves battery safety in the event of short-circuiting or the like by closing the pores of a separator by causing a resin constituting the separator to melt at a temperature less than or equal to a temperature at which thermal runaway (overheating) occurs in the battery so as to increase the internal resistance of the battery, polyethylene (PE), which has a low melting point, is used as a material for separators.

For the separator, for example, a film that is uniaxially or biaxially drawn so as to increase porosity and improve strength is used. Such a separator is supplied as a film that exists as a single film, and thus is required to have a certain strength in terms of workability. For this reason, it is drawn to secure a certain strength. However, because the crystallinity of such a drawn film increases, and the shutdown temperature also increases to a temperature close to the thermal runaway temperature of the battery, it cannot be said that the margin for securing battery safety is sufficient.

There is also another problem that distortion occurs in the film when drawn, and if the film is exposed to high temperatures, the film shrinks due to residual stress. Because the shrinkage temperature is very close to the melting point, or in other words, the shutdown temperature, in the case of using the polyolefin porous film separator, it is necessary to prevent temperature increase in the battery by reducing the current immediately when the battery temperature reaches the shutdown temperature in the event of a charge failure or the like. If the pores do not close sufficiently, failing to reduce the current immediately, the battery temperature quickly rises to the separator's shrinkage temperature, causing a risk of thermal runaway due to internal short-circuiting.

Various technical developments have been carried out to prevent short-circuiting caused by such separator thermal shrinkage so as to enhance battery reliability. For example, Patent Document 1 proposes an electrochemical device configured of a separator including a porous substrate with a good heat resistance, filler particles, and a resin component for securing the shutdown function.

Also, Patent Document 2 proposes a technique to use, in a lithium ion secondary battery, a separator including a porous film in which secondary particles are bonded by a binder, the secondary particles prepared through sintering or melt-recrystallization of a part of primary particles of a ceramic material having a band gap.
Patent Document 1: WO 2006/62153A
Patent Document 2: JP 2006-147569A For example, according to the technique disclosed in Patent Document 1, it is possible to provide a safe electrochemical device in which thermal runaway will not easily occur even in the event of overheating.

However, the trend toward higher performance devices to which electrochemical devices, including lithium secondary batteries, are applied is expected to grow continuously in the future, and demand is also expected to increase for, for example, electrochemical devices with improved load characteristics. With this increased demand, demand will rise for development of separators that can enhance load characteristics of electrochemical devices, in addition to further improvement of safety of electrochemical devices and improved reliability of electrochemical devices by suppressing the occurrence of a micro-short circuit due to lithium dendrites, or the like.

DISCLOSURE OF INVENTION

A separator for an electrochemical device of the present invention includes a porous film including: a filler; an organic binder; and at least one resin selected from resin A that has a melting point of 80 to 140° C. and resin B that absorbs a non-aqueous electrolyte and swells upon heating and whose swelling degree increases with increasing temperature, wherein the filler contains boehmite having a secondary particle structure in which primary particles are connected.

An electrode for an electrochemical device of the present invention is an electrode including an active material-containing layer, wherein a porous separator layer that primarily contains boehmite having a secondary particle structure in which primary particles are connected is formed on a surface of the active material-containing layer.

A first electrochemical device of the present invention is an electrochemical device including a positive electrode, a negative electrode, a non-aqueous electrolyte and a separator, wherein the separator is the above-described separator for an electrochemical device of the present invention.

A second electrochemical device of the present invention is an electrochemical device including a positive electrode, a negative electrode, a non-aqueous electrolyte and a separator, wherein at least one of the positive electrode and the negative electrode is the above-described electrode for an electrochemical device of the present invention, and a microporous film containing resin A that has a melting point of 80 to 140° C. is disposed between the positive electrode and the negative electrode.

According to the present invention, it is possible to provide a separator for an electrochemical device with which it is possible to configure an electrochemical device that has good reliability, good safety, and superior load characteristics, and an electrochemical device that includes such a separator and that has superior reliability, superior safety and superior load characteristics.

According to the present invention, it is also possible to provide an electrode for an electrochemical device with which it is possible to configure an electrochemical device that has good reliability, good safety, and superior load characteristics, and an electrochemical device that includes such an electrode and that has superior reliability, superior safety and superior load characteristics.

BRIEF DESCRIPTION OF DRAWING

FIG. 1 is a schematic diagram of boehmite having a secondary particle structure in which primary particles are connected according to the present invention.

BEST MODE FOR CARRYING OUT THE INVENTION

A separator for an electrochemical device (hereinafter also referred to simply as a "separator") of the present invention contains at least one resin selected from resin A that has a melting point of 80 to 140° C. and resin B that absorbs a non-aqueous electrolyte (hereinafter also referred to simply as an "electrolyte") and swells upon heating and whose swelling degree increases with increasing temperature.

With the separator of the present invention containing resin A, when the temperature of an electrochemical device in which the separator of the present invention is incorporated reaches the melting point of resin A, resin A melts and closes the pores of the separator to cause a shut down that hinders the progress of electrochemical reactions. With the separator of the present invention containing resin B, as the battery temperature increases, resin B absorbs the electrolyte in the battery and swells, and the swollen particles close the pores of the separator, and at the same time, the amount of flowable electrolyte that exists within the pores decreases, causing a shutdown.

In the separator of the present invention boehmite having a secondary particle structure in which primary particles are connected or boehmite having the secondary particle structure and a static bulk density of 0.1 to 0.5 g/cm$^3$ is used as a filler. The filler is to secure separator's primary function, that is, a function for preventing short-circuiting as a result of direct contact between the positive and negative electrodes. For example, in the case of an electrode assembly configured by pressing the positive and negative electrodes together with a separator interposed therebetween (in particular, a spirally wound electrode assembly formed by spirally winding a laminate of positive and negative electrodes with a separator interposed therebetween, a flat electrode assembly formed by flattening such a spirally wound electrode assembly, etc.), it is possible to prevent the occurrence of short-circuiting as a result of the positive electrode active material penetrating the separator to make contact with the negative electrode in a temperature range where electrochemical devices are usually used. Even if lithium dendrites are formed, the use of the filler also prevents the dendrites from penetrating through the separator. Accordingly, it is possible to configure a highly reliable electrochemical device in which the occurrence of a micro-short circuit due to lithium dendrites is suppressed.

Furthermore, even if the electrochemical device is heated to a high temperature, and the separator temperature increases by 20° C. or more after a shutdown has occurred due to the resin A or resin B, the filler can suppress the thermal shrinkage of the separator, allowing the separator to retain its shape. Accordingly, it is also possible to prevent short-circuiting (short-circuiting as a result of direct contact between the positive and negative electrodes) caused by thermal shrinkage which usually occurs in conventional separators comprised of a porous PE film.

With the separator of the present invention, it is possible to secure, by the above-described functions, reliability and safety when the inside of an electrochemical device overheats.

Furthermore, by using, as a filler, boehmite having a secondary particle structure in which primary particles are connected, in particular, boehmite having the secondary particle structure and a static bulk density of 0.1 to 0.5 g/cm$^3$ to configure a separator, the load characteristics of an electrochemical device configured using that separator can also be enhanced.

The resin A used in the separator of the present invention has a melting point of 80 to 140° C., and it is preferable that the melting point is 130° C. or lower. In the present specification, the melting point of resin A is obtained as a melting temperature measured by a differential scanning calorimeter (DSC) in accordance with JIS (Japanese Industrial Standard) K 7121.

It is preferable that the resin A is an electrochemically stable material that has electrical insulation properties, is stable in the electrolyte of an electrochemical device, and is not easily oxidized or reduced in an operating voltage range of the electrochemical device. Specific examples include polyethylene (PE), copolymerized polyolefin, or polyolefin derivative (chlorinated polyethylene, etc.), polyolefin wax, petroleum wax, carnauba wax, etc. Examples of the copolymerized polyolefin include ethylene-vinyl monomer copolymer, more specifically, an ethylene-acrylic acid copolymer such as ethylene-vinyl acetate copolymer (EVA), ethylene-methyl acrylate copolymer or ethylene-ethyl acrylate copolymer. It is desirable that 85 mol % or more of ethylene-derived structural unit is included in the copolymerized polyolefin. It is also possible to use polycycloolefin or the like. As the resin A, the above-listed resins may be used alone or in a combination of two or more.

Among the above-listed materials, it is preferable to use, as the resin A, PE, polyolefin wax, or ethylene-vinyl monomer copolymer (in particular, EVA with 85 mol % or more of ethylene-derived structural unit). The resin A may further contain various additives (e.g., antioxidant, etc.) as appropriate.

As the resin B used in the separator of the present invention, usually, a resin is used that absorbs no electrolyte or a limited amount of electrolyte in a temperature range (approximately 70° C. or lower) at which electrochemical devices are used, and therefore has a swelling degree lower than or equal to a prescribed level, but when heated to a temperature at which a shutdown is necessary, absorbs an electrolyte and swells significantly and whose swelling degree increases with increasing temperature. In an electrochemical device configured using the separator containing resin B, because a flowable electrolyte that is not absorbed by the resin B exists within the pores of the separator in a temperature range lower than the shutdown temperature, and the Li (lithium) ion conductivity inside the separator increases, an electrochemical device with good load characteristics can be obtained. On the other hand, when heated to a temperature higher than or equal to the temperature at which a property in which the swelling degree increases with increasing temperature (hereinafter also referred to as a "thermal swelling property") appears, a shutdown occurs to secure safety in the electrochemical device because the resin B absorbs the electrolyte in the battery and swells significantly, and the swelled resin B closes the pores of the separator, and at the same time, the amount of the flowable electrolyte decreases, leading to electrolyte deficiency in the electrochemical device. Moreover, when heated to a high temperature above the shutdown temperature, because the electrolyte deficiency further proceeds due to the thermal swelling property, and the reactions in the electrochemical device are further suppressed, high-temperature safety after shutdown can also be enhanced.

It is preferable that the temperature at which resin B starts to exhibit the thermal swelling property is 75° C. or higher. By setting the temperature at which resin B starts to exhibit the thermal swelling property to 75° C. or higher, the temperature (what is called a shutdown temperature) at which the Li ion conductivity decreases significantly to increase the internal resistance of the electrochemical device can be set to approximately 80° C. or higher. On the other hand, the shutdown temperature of the separator increases as the lower limit temperature for exhibiting the thermal swelling property increases, and therefore it is preferable that the temperature at which resin B starts to exhibit the thermal swelling property to 125° C. or lower, and more preferably 115° C. or lower so as to set the shutdown temperature to approximately 130° C. or lower. When the temperature at which the thermal swelling property is exhibited is too high, the thermal runaway reaction of the active material of the battery cannot be suppressed sufficiently, and the effect of improving safety in the electrochemical device may not be secured sufficiently. Conversely, when the temperature at which the thermal swelling property is exhibited is too low, the Li ion conductivity in a temperature range (approximately 70° C. or lower) at which electrochemical devices are usually used may become too low.

It is desirable that resin B absorbs the electrolyte as little as possible and swells less at a temperature lower than the temperature at which the thermal swelling property is exhibited. This is because the characteristics of the electrochemical device, such as load characteristics, can be improved when the electrolyte is maintained in a flowable state in the pores of the separator in a temperature range at which electrochemical devices are used, such as, for example, at room temperature, rather than the electrolyte becoming incorporated into the resin B.

The amount of electrolyte absorbed by resin B at 25° C. can be evaluated with a swelling degree $B_R$ that is defined by the following Formula (1) that represents a volume change of resin B.

$$B_R = (V_0/V_i) - 1 \quad (1)$$

In the above formula, $V_0$ represents the volume (cm$^3$) of resin B obtained 24 hours after the resin B is immersed in an electrolyte at 25° C., and $V_i$ represents the volume (cm$^3$) of resin B before resin B is immersed in the electrolyte.

In the separator of the present invention, it is preferable that the swelling degree $B_R$ of resin B at 25° C. is 1 or less, and it is desirable that the swelling as a result of absorbing electrolyte is small, or in other words, $B_R$ is a small value that is as close as possible to 0. It is also desirable that the change in the swelling degree with temperature is as small as possible in a temperature range lower than the temperature at which the thermal swelling property is exhibited. In the separator in which resin B is bonded with an organic binder, it is sufficient that the swelling degree of resin B is a small value in a state where the resin B exists with the organic binder.

On the other hand, as the resin B, a resin is used whose electrolyte absorption amount increases when heated to the lower limit or more of the temperature at which the thermal swelling property is exhibited, and whose swelling degree increases with temperature in a temperature range in which thermal swelling property is exhibited. For example, it is preferable to use a resin whose swelling degree $B_T$ that is defined by the following Formula (2) and measured at 120° C. is 1 or greater.

$$B_T = (V_1/V_0) - 1 \quad (2)$$

In the formula, $V_0$ represents the volume (cm$^3$) of resin B obtained 24 hours after the resin B is immersed in an electrolyte at 25° C., and $V_1$ represents the volume (cm$^3$) of resin B obtained after the resin B is immersed in an electrolyte at 25° C. for 24 hours, the electrolyte is then heated to 120° C., and then the temperature is held at 120° C. for one hour.

When the swelling degree of resin B defined by the above Formula (2) is too large, the electrochemical device may deform. Accordingly, it is desirable that the swelling degree is 10 or less.

The swelling degree defined by the above Formula (2) can be estimated by directly measuring a size change of resin B with a method such as a light scattering method or image analysis in which images captured by a CCD camera or the like are analyzed, but it can be measured more accurately using, for example, the following method.

A slurry is prepared by mixing resin B with a solution or emulsion of a binder resin whose swelling degrees at 25° C. and 120° C. defined by Formulas (1) and (2) given above are known. Then, a film is produced by applying this slurry onto a substrate such as a polyethylene terephthalate (PET) sheet or glass plate, and the mass of the film is measured. This film is then immersed in an electrolyte at 25° C. for 24 hours, and the mass of the film is measured. Furthermore, the electrolyte is heated to 120° C., the film is kept immersed in the electrolyte at 120° C. for one hour, and the mass of the film is measured. Then, a swelling degree $B_T$ is calculated using Formulas (3) to (9) given below. Note that, in the below Formulas (3) to (9), the volume increase of components other than the electrolyte when heated from 25° C. to 120° C. is ignored.

$$V_i = M_i \times W/P_A \quad (3)$$

$$V_B = (M_0 - M_i)/P_B \quad (4)$$

$$V_C = M_1/P_C - M_0/P_B \quad (5)$$

$$V_V = M_i \times (1-W)/P_V \quad (6)$$

$$V_0 = V_i + V_B - V_V \times (B_B + 1) \quad (7)$$

$$V_D = V_V \times (B_B + 1) \quad (8)$$

$$B_T = \{V_0 + V_C - V_D \times (B_C + 1)\}/V_0 - 1 \quad (9)$$

In the above Formulas (3) to (9), $V_i$: the volume (cm$^3$) of resin B obtained before it is immersed in an electrolyte, $V_0$: the volume (cm$^3$) of resin B obtained 24 hours after it is immersed in an electrolyte at 25° C., $V_B$: the volume (cm$^3$) of electrolyte absorbed in a film obtained 24 hours after it is immersed in an electrolyte at 25° C., $V_C$: the volume (cm$^3$) of electrolyte absorbed in a film obtained after it is immersed in an electrolyte at 25° C. for 24 hours, the electrolyte is then heated to 120° C., and then the film is kept immersed in the electrolyte at 120° C. for one hour, $V_V$: the volume (cm$^3$) of binder resin obtained before it is immersed in an electrolyte, $V_D$: the volume (cm$^3$) of binder resin obtained 24 hours after it is immersed in an electrolyte at 25° C., $M_i$: the mass (g) of a film obtained before it is immersed in an electrolyte, $M_0$: the mass (g) of a film obtained 24 hours after being it is immersed in an electrolyte at 25° C., $M_1$: the mass (g) of a film obtained after the film is immersed in an electrolyte at 25° C. for 24 hours, the electrolyte is heated to 120° C., and then the film is kept immersed in the electrolyte at 120° C. for one hour, W: the mass ratio of resin B in a film obtained before it is immersed in an electrolyte, $P_A$: the specific gravity (g/cm$^3$) of resin B obtained before it is immersed in an electrolyte, $P_B$: the specific gravity (g/cm$^3$) of electrolyte obtained at 25° C., $P_C$: the specific gravity (g/cm$^3$) of electrolyte obtained at a prescribed temperature, $P_V$: the specific gravity (g/cm$^3$) of binder resin obtained before it is immersed in an electrolyte, $B_B$: the swelling degree of binder resin obtained 24 hours after it is immersed in an electrolyte at 25° C., and $B_C$: the swelling degree of binder resin defined by Formula 2 given above when heated.

In addition, a swelling degree $B_R$ at 25° C. can be determined from Vi and $V_0$ determined from the above Formulas (3) and (7) by the above-described method using the above Formula (1).

Because the separator of the present invention is configured to be used in electrochemical devices that include a non-aqueous electrolyte, which conventionally employ, as the non-aqueous electrolyte, for example, a solution obtained by dissolving a lithium salt in an organic solvent (details, such as the type of lithium salt, the type of organic solvent, and lithium salt concentration, will be described later), it is advisable to use, as the resin B, a resin that starts to show the thermal swelling property in an organic solvent solution of a lithium salt when the temperature reaches a temperature from 75 to 125° C., and preferably is capable of swelling such that swelling degrees $B_R$ and $B_T$ satisfy the above-described values in the solution.

The resin B preferably is a material that has heat resistance and electrical insulation properties, is stable in electrolytes, and is not easily oxidized or reduced in an operating voltage range of electrochemical devices and thus is electrochemically stable. An example of such a material is a cross-linked resin. Specific examples include: at least one cross-linked resin selected from the group consisting of styrene resin [polystyrene (PS), etc.], styrene butadiene rubber (SBR), acrylic resin [polymethylmethacrylate (PMMA) etc.], polyalkylene oxide [polyethylene oxide (PEO) etc.], fluorocarbon resin [polyvinylidene fluoride (PVDF) etc.], and derivatives thereof; urea resin; polyurethane; etc. As the resin B, the above-listed resins may be used alone or in a combination of two or more. Where appropriate, the resin B may further contain various additives, such as for example, an antioxidant, etc.

Among the above-listed component materials, it is preferable to use cross-linked styrene resin, cross-linked acrylic resin, and cross-linked fluorocarbon resin, and preferably cross-linked PMMA in particular.

Although the mechanism with which these cross-linked resins absorb an electrolyte and swell with increasing temperature is not clearly known, it is considered that there is a correlation with glass transition temperature (Tg). Specifically, it is presumed that, generally, resins become flexible when heated to their Tg, and thus, resins as listed above can absorb a large amount of electrolyte at a temperature higher than or equal to their Tg, and as a result, swell. Accordingly, it is desirable to use, as the resin B, a cross-linked resin having a Tg of approximately 75 to 125° C. considering the fact that the temperature at which the shutdown action actually occurs is somewhat higher than the temperature at which the resin B starts showing the thermal swelling property. In the present specification, the Tg of a cross-linked resin serving as resin B is a value measured using a DSC in accordance with JIS K 7121.

The cross-linked resins have some reversibility when a volume change occurs with temperature change, that is to say, when in a so-called dry state before electrolyte absorption, the cross-linked resins expand with increasing temperature, but again shrink when the temperature is lowered. In addition, they have a heat resistance temperature much higher than the temperature at which the thermal swelling property is exhibited, so even when the lower limit of the temperature at which the thermal swelling property is exhibited is 100° C. or so, it is possible to select a material that can be heated to 200° C. or higher. Accordingly, handling in the production process that involves an ordinary heating process is facilitated because the resin will not melt and the resin's thermal swelling property will not be impaired even when the resins are heated in a separator production process or the like.

There is no particular limitation on the morphology of the resin A and resin B, and in addition to taking the form of fine particles, they may be contained in a separator by, for example, applying the resin onto the surface of a fibrous material constituting a porous substrate as a core, or covering the surface with the resin, which will be described later. They may be contained in a separator in the form of a core-shell structure, with a filler or the like having a heat resistance temperature of 150° C. or higher as a core and the resin A or resin B as a shell. In addition, in the case of using both resin A and resin B, they can be integrated together before use by, for example, applying the resin A onto the surface of the resin B, or covering the surface of the resin B with the resin A. Among the above, it is particularly preferable to use the resin A and the resin B as fine particles.

In the case where the resin A and the resin B are fine particles, the particle size in a dry state should be smaller than the thickness of a separator, and preferably, they have an average particle size 1/100 to 1/3 the thickness of the separator. Specifically, the resin A and the resin B preferably have an average particle size of 0.1 to 20 µm. When the resin A and the resin B have an excessively small particle size, the space between particles will be small, extending an ion conduction path and degrading the characteristics of the electrochemical device. It is also undesirable for the particle size to be excessively large because the separator thickness will become large, causing degradation of energy density in the electrochemical device. In the present specification, the average particle size of fine particles (the resin A, the resin B, a filler described later, and plate-like particles described later) is defined as a number average particle size measured using a laser scattering particle size distribution analyzer (e.g., LA-920 available from HORIBA, Ltd.) by dispersing the fine particles in a medium, the medium being a medium that does not cause a resin to swell in the case of the resin A or resin B (e.g., water), and being a medium that does not dissolve particles in the case of a filler or plate-like particles that will be described later.

The resin A or the resin B can be contained in a separator exclusively, or in a combination of each other.

As the content (volume ratio) of the resin A and the resin B in the separator of the present invention, in order to make it easier to obtain the shutdown effect, it is preferable that the total volume of the resin A and the resin B in all of the constituent components of the separator is 10 vol % or more, and more preferably 20 vol % or more. Also, it is preferable that the total volume of the resin A and the resin B is 20% or more of the pore volume of the separator. In the present specification, the expression "the total volume of the resin A and the resin B is 20% or more of the pore volume of the separator" means that the total volume of the resin A and the resin B accounts for 20% or more when the pore volume of the separator is set to 100%. The same applies to the relationship between the pore volume of a first separator layer and the total volume of the resin A and the resin B, which will be described later.

From the viewpoint of securing shape stability of the separator at high temperatures, it is preferable that the total volume of the resin A and the resin B in all of the constituent components of the separator is 80 vol % or less, and more preferably 40 vol % or less.

In the separator of the present invention, boehmite 2 having a secondary particle structure in which primary particles 1 are connected, as schematically shown in FIG. 1, is used as a filler. In FIG. 1, dots are shown in the right side face of each primary particle 1 so as to facilitate the understanding of the primary particles 1 in a three dimensional manner, but they are not characteristics of the material of the primary particles 1.

As already described above, the aim of using a filler is to secure the separator's primary function, to prevent short-circuiting as a result of contact between the positive and negative electrodes by suppressing the thermal shrinkage of the separator to retain the shape when the internal temperature of the electrochemical device rises, and to suppress the occurrence of a micro-short circuit by preventing lithium dendrites from penetrating through the separator when the lithium dendrites are formed.

On the other hand, the filler may act as an adverse factor in ion conduction in the separator, and cause degradation of load characteristics of the electrochemical device. However, in the separator of the present invention, by using boehmite having a secondary particle structure in which primary particles are connected, in particular, boehmite having the secondary particle structure and a static bulk density of 0.1 to 0.5 g/cm$^3$ as a filler, the load characteristics of the electrochemical device can be enhanced while securing good effects obtained through the use of the filler. Although the reason for this is not clearly known, it is presumed that, due to boehmite having a secondary particle structure as described above, the pore size and tortuosity factor (described later) of the separator can be adjusted to such a level that it is possible to obtain good ion conduction and favorably suppress penetration by lithium dendrites, for example.

As the boehmite having a secondary particle structure in which primary particles are connected, it is possible to use an aggregate that does not easily disintegrate into primary particles in an ordinary dispersing process, for example, an aggregate in which boehmite primary particles are intergrown and connect to each other to form secondary particles.

The secondary particles can be obtained by, for example, subjecting aluminum hydroxide, together with a reaction accelerator, water and the like, to a hydrothermal treatment. Aluminum hydroxide with an average particle size of approximately 0.1 to 10 μm can be used. Here, it is preferable to use aluminum hydroxide whose particle size is adjusted by pulverization because intergrown aggregates as described above can be readily formed. As the reaction accelerator, inorganic compounds such as a hydroxide, an oxide, a chloride, a carbonate salt, a sulfate salt, a nitrate salt, a phosphate salt, a borate salt and the like of an alkali metal or alkaline-earth metal; and organic compounds such as an acetate salt, an oxalate salt and the like of an alkali metal or alkaline-earth metal can be used. It is sufficient to add the reaction accelerator in an amount of approximately 0.0001 to 1 mol with respect to 1 mol of aluminum hydroxide. In order to facilitate the growth of crystals, a polyacrylic acid ester or the like may be added.

The intended boehmite can be obtained by placing the aluminum hydroxide, the reaction accelerator, water and the like in a pressure-resistant vessel such as an autoclave, allowing them to react at a temperature of approximately 140 to 350° C. for approximately 1 to 50 hours, and washing, filtrating and drying a product produced by the reaction. The particle size, shape and the like of the primary particles or secondary particles can be adjusted as appropriate by changing the particle size of aluminum hydroxide, the type and amount of reaction accelerator, the reaction temperature, the reaction time and the like. The obtained boehmite may be used as produced, or may be subjected to particle size adjustment where necessary.

There is no limitation on the shape of the secondary particles to be formed, but in order to obtain more preferable pore size and tortuosity factor, it is desirable that the particles are agglomerated or amorphous, rather than spicular in which pores are not easily formed between particles.

It is also possible to use a commercially available boehmite powder having a secondary particle structure, such as for example, a boehmite powder (product number: C06, C20) available from Taimei Chemicals Co., Ltd.

The average particle size (the number average particle size measured by the above-described measurement method) of the boehmite having a secondary particle structure preferably is, for example, 0.01 μm or more, and more preferably 0.1 μm or more, and preferably 15 μm or less, and more preferably 5 μm or less from the viewpoint of effectively obtaining the effects produced through the use thereof.

Also, it is desirable that the particle size of boehmite primary particles that constitute secondary particles is $\frac{1}{10}$ to $\frac{1}{3}$ the particle size of the secondary particles. When the particle size of the primary particles is smaller than $\frac{1}{10}$ the particle size of the secondary particles, the specific surface area of the particles will be too large, requiring a large amount of organic binder, which will be described later, and a disadvantage that the pores of the separator will be too small may be caused. When the particle size of the primary particles is larger than $\frac{1}{3}$ the particle size of the secondary particles, the tortuosity factor of the separator will be too small, and the effect of suppressing a short circuit due to penetration by lithium dendrites may become small. The particle size of each individual secondary particle and the particle size of a primary particle constituting the secondary particle can be determined using a scanning electron microscope (SEM).

The boehmite having a secondary particle structure preferably has a specific surface area of 3 m$^2$/g or more, and more preferably 10 m$^2$/g or more, and preferably 50 m$^2$/g or less, and more preferably 30 m$^2$/g or less. The specific surface area can be determined by a gas adsorption method. Also, the boehmite having a secondary particle structure preferably has a static bulk density of 0.1 g/cm$^3$ or more, and more preferably 0.15 g/cm$^3$ or more, and preferably 0.5 g/cm$^3$ or less, and more preferably 0.3 g/cm$^3$ or less. The static bulk density can be determined based on JIS C 2141 "Testing Methods of Ceramic Materials for Electrical Insulation Applications". Because the boehmite secondary particles are made up of primary particles connected to each other, or in other words, have a secondary particle structure, the above-described specific surface area and static bulk density can be secured. Accordingly, use of boehmite secondary particles with the above-described specific surface area and static bulk density can provide a separator of the present invention with which it is possible to configure an electrochemical device that has superior safety, superior reliability, and superior load characteristics.

The separator of the present invention may further contain another filler, in addition to the boehmite having a secondary particle structure in which primary particles are connected. The filler other than the boehmite having a secondary particle structure can be an organic particle or inorganic particle as long as it has heat resistance and electrical insulation properties, is stable in electrolytes and solvents used for production of the separator, is not easily oxidized or reduced in an operating voltage range of the electrochemical device, and is electrochemically stable. From the viewpoint of dispersibility in the separator, and the like, the filler preferably is a fine particle, and from the viewpoint of safety, and the like, an inorganic fine particle is preferably used.

Specific examples of the component material of such an inorganic particle include: inorganic oxides such as iron oxide, $SiO_2$, $Al_2O_3$, $TiO_2$, $BaTiO_2$ and $ZrO_2$; inorganic nitrides such as aluminum nitride and silicon nitride; poorly soluble ion crystals such as calcium fluoride, barium fluoride and barium sulfate; covalent crystals such as silicon and diamond; and clay such as montmorillonite. The inorganic oxides can be mineral resource-derived materials such as boehmite (the above-described boehmite without a secondary particle structure), zeolite, apatite, kaolin, mullite, spinel, olivine and mica; and artificial materials thereof. It is also possible to use particles with electrical insulation properties obtained by covering the surface of an electrically conductive oxide such as a metal, $SnO_2$ or tin-indium oxide (ITO), or an electrically conductive material such as a carbonaceous material (carbon black graphite, etc.), with a material having electrical insulation properties (e.g., an inorganic oxide listed above, etc.). Among the above-listed inorganic oxides, it is particularly preferable to use $Al_2O_3$, $SiO_2$ and boehmite.

Examples of organic fine particles (organic powder) mentioned above include: various cross-linked polymer fine particles (except for those of resin B) such as cross-linked polymethyl methacrylate, cross-linked polystyrene, cross-linked polyvinyl benzene, cross-linked styrenedivinyl benzene copolymer, polyimide, melamine resin, phenolic resin and benzoguanamine-formaldehyde condensation polymer, and heat resistant polymer fine particles such as polypropylene (PP), polysulfone, polyacrylonitrile, aramid, polyacetal and thermoplastic polymide. The organic resin (polymer) that constitutes these organic fine particles can be a mixture, modified form, derivative, copolymer (random copolymer, alternating copolymer, block copolymer, graft copolymer), cross-linked form (in the case of the heat resistant polymer fine particles) of the above-listed materials.

In the case where the filler other than the boehmite having a secondary particle structure is a plate-like particle, due to its shape, the effect of preventing dendrites can be expected. Accordingly, use of plate-like particles as a filler can effectively improve separator's dendrite resistance. The plate-like particles may be boehmite or any other compound.

As the morphology of the plate-like particles, it is desirable that the aspect ratio (the ratio of the maximum length of the plate-like particles and the thickness of the plate-like particles) is 5 or more, more preferably 10 or more, and 100 or less, and more preferably 50 or less. Also, it is desirable that the average value of the ratio of the major axis direction length to the minor axis direction length of a flat surface of the particles (major axis direction length/minor axis direction length) is 3 or less, more preferably 2 or less, and a value closer to 1.

The average value of the ratio of the major axis direction length to minor axis direction length of a flat surface of the plate-like particles can be determined by, for example, analyzing an image captured by a scanning electron microscope (SEM). The aspect ratio of the plate-like particles can also be determined by analyzing an image captured by an SEM.

It is sufficient that the plate-like particles have an average particle size that is smaller than the separator thickness, and preferably, 1/100 or more the separator thickness. More specifically, the average particle size preferably is, in terms of number average particle size measured by the above-described measurement method, for example, 0.01 µm or more, more preferably 0.1 µm or more, and preferably 15 µm or less, more preferably 5 µm or less. As for the filler other than the boehmite having a secondary particle structure that is not a plate-like particle, the average particle size preferably is, in terms of number average particle size measured by the above-described measurement method, for example, 0.01 µm or more, more preferably 0.1 µm or more, and preferably 15 µm or less, more preferably 5 µm or less.

As the existing form of the plate-like particles in the separator, it is preferable that the flat surface is substantially parallel to the separator surface. More specifically, for the plate-like particles near the separator surface, the average angle between the flat surface of the particle and the separator surface preferably is 30° or less, and even more preferably, the average angle is 0°, or in other words, the flat surface of the flake near the separator surface is parallel to the separator surface. As used herein, the term "near the separator surface" refers to an area that extends from the surface of a separator to approximately 10% of the total thickness of the separator. When the plate-like particles exist in the above-described form, it is possible to effectively prevent internal short-circuiting that is caused by lithium dendrites deposited on the electrode surface or by protrusion of active material on the electrode surface from occurring.

The total amount of the filler including the boehmite having a secondary particle structure in the separator of the present invention preferably is 20 vol % or more of the total volume of the constituent components of the separator, and more preferably 50 vol % or more, in order to further improve the effect of preventing internal short-circuiting. In order to maintain shutdown characteristics while securing the amount of the resin A and the resin B in the separator of the present invention, the total amount of the filler including the boehmite having a secondary particle structure in the separator preferably is reduced to 80 vol % or less of the total volume of constituent components of the separator.

It is necessary that the amount of the filler other than the boehmite having a secondary particle structure in the separator of the present invention is within a range that does not significantly impair the effect produced through use of the boehmite having a secondary particle structure. It is desirable that, for example, when it is assumed that the volume of the boehmite having a secondary particle structure is 100, the volume of the filler other than the boehmite having a secondary particle structure is 30 or less. In order to further enhance the effect of the filler other than the boehmite having a secondary particle structure, it is desirable that the volume is approximately 10 or more. That is, when a filler other than the boehmite having a secondary particle structure is used, it is desirable that the boehmite having a secondary particle structure accounts for approximately 75 vol % or more of the total volume of the filler, and that another filler account for approximately 10 vol % or more.

The organic binder used for the separator of the present invention can be, for example, an ethylene-acrylic acid copolymer such as EVA (with 20 to 35 mol % of vinyl acetate-derived structural unit) or ethylene-ethyl acrylate copolymer, fluorine-based rubber, styrene butadiene rubber (SBR), carboxymethyl cellulose (CMC), hydroxyethyl cellulose (HEC), polyvinyl alcohol (PVA), polyvinyl butyral (PVB), polyvinyl pyrrolidone (PVP), cross-linked acrylic resin, polyurethane, epoxy resin, etc. In particular, it is preferable to use a heat resistance binder having a heat resistance temperature of 150° C. or higher. The above-listed organic binders may be used alone or in a combination of two or more.

When the resin A and the resin B have adhesion ability, they can also serve as an organic binder. Accordingly, the resins with adhesion ability among those listed for the resin A and the resin B can also be included as specific examples of the organic binder.

Among the above-listed organic binders, it is preferable to use a highly flexible binder such as EVA, ethylene-acrylic acid copolymer, fluorine-based rubber or SBR. Specific examples of such a highly flexible organic binder include Evaflex Series (EVA) available from Mitsui Dupont Polychemical Co., Ltd., EVA available from Nippon Unicar Co., Ltd., Evaflex EEA Series (ethylene-acrylic acid copolymer) available from Mitsui Dupont Polychemical Co., Ltd., EEA available from Nippon Unicar Co., Ltd., DAI-EL Latex Series (fluorine rubber) available from Daikin Industries, Ltd., TRD-2001 (SBR) available from JSR Corporation, and EM400B (SBR) available from Zeon Corporation, Japan.

The above organic binders can be used in the form of an emulsion by being dissolved or dispersed in a solvent of a separator-forming composition, which will be described later.

In order to secure the shape stability and flexibility of the separator, a fibrous material or the like may be combined with the boehmite having a secondary particle structure, a filler other than the boehmite having a secondary particle structure, the resin A, and the resin B. There is no particular limitation on the fibrous material as long as it has a heat resistance temperature of 150° C. or higher, electrical insulation properties, is electrochemically stable, and also stable in an electrolyte and a solvent used for production of the separator, which will be described in detail below. In the present specification, the term "fibrous material" means a fibrous material having an aspect ratio [length in a longitudinal direction/width (diameter) in a direction perpendicular to the longitudinal direction] of 4 or more, and preferably, an aspect ratio of 10 or more.

Specific examples of the fibrous material include resins such as cellulose and its derivative [carboxymethyl cellulose (CMC), hydroxypropyl cellulose (HPC) etc.], polyolefin [polypropylene (PP), propylene copolymer, etc.], polyester [polyethylene terephthalate (PET), polyethylene naphthalate (PEN), polybutylene terephthalate (PBT) etc.], polyacrylonitrile (PAN), aramid, polyamide imide and polyimide; and inorganic oxides such as glass, alumina, zirconia and silica. The fibrous material may be formed by combining two or more of these component materials. The fibrous material may contain, as appropriate, various additives (e.g., an antioxidant, etc. in the case of a resin fibrous material).

Although details will be described later, the separator of the present invention can be integrated with an electrode (positive electrode or negative electrode) of an electrochemical device, or can be used as an independent film without being integrated with an electrode. Particularly when the separator is used as an independent film, it is preferable to use a porous substrate made of the fibrous material described above, or a film-like porous substrate made of a resin. With this, it is possible to increase the strength of the separator and improve ease of handling. A porous substrate may also be used in a separator configured to be integrated with an electrode of an electrochemical device.

An example of the porous substrate made of a fibrous material is a sheet-like product of the above-described fibrous material, such as a woven fabric or non-woven fabric (including paper), having a heat resistance temperature of 150° C. or higher, and a commercially available non-woven fabric or the like can be used. In the separator of this embodiment, it is preferable that the fine particles of the filler, resin A and resin B are contained in the pores of the porous substrate. Also, the fine particles of the filler, resin A and resin B can be bonded to the porous substrate with an organic binder described above.

The resin that constitutes a film-like porous substrate may be resin A described above, or a resin having a higher heat resistance than resin A. Examples include a porous film made of resin A, a porous film made of a resin having a heat resistance temperature of 150° C. or higher, a porous film made of resin A and a resin having a higher melting point than resin A, and a laminate of a porous film made of resin A and a porous film made of a resin having a higher melting point than resin A, and commercially available microporous films and the like can be used. In the separator of this embodiment, the fine particles of the filler, resin A and resin B are caused to exist on the surface of the porous substrate. Also, the fine particles of the filler, resin A and resin B can be bonded to the porous substrate with an organic binder described above.

The term "heat resistance" of the porous substrate means there being no substantial change in dimensions due to softening or the like, and is evaluated by determining whether or not an upper limit temperature (heat resistance temperature) is sufficiently higher than the shutdown temperature, the upper limit temperature being a temperature at which a change in length of a target, that is, in the porous substrate, the rate of shrinkage in length at room temperature (25° C.) (shrinkage rate) can be maintained at 5% or less. In order to enhance safety in the electrochemical device after shutdown, it is desirable that the porous substrate has a heat resistance temperature higher than the shutdown temperature by 20° C. or more. More specifically, it is preferable that the porous substrate has a heat resistance temperature of 150° C. or higher, and more preferably 180° C. or higher.

When configuring a separator using the porous substrate made of a fibrous material, it is preferable that all or part of the particulate components, such as the resin A, the resin B and the filler (boehmite having a secondary particle structure and other fillers), exist within the pores of the porous substrate. With this configuration, the action of the resin A, the resin B and the filler, can be effectively exhibited.

It is sufficient that the diameter of the fibrous material (including a fibrous material that constitutes a porous substrate, and other fibrous materials) is less than or equal to the separator thickness, but the diameter preferably is, for example, 0.01 to 5 μm. When the diameter is too large, sufficient entanglement will not be obtained in the fibrous material, so if the porous substrate is configured by forming a sheet-like product, for example, its strength will be small, deteriorating the ease of handling. Conversely, when the diameter is too small, there is a tendency that the pores of the separator will be too small, deteriorating ion permeability, and as a result, the load characteristics of the electrochemical device may be reduced.

The amount of the fibrous material in the separator of the present invention preferably is, for example, 10 vol % or more of the total volume of the constituent components of the separator, and more preferably 20 vol % or more, and preferably 90 vol % or less, and more preferably 80 vol % or less. As the existing state of the fibrous material in the separator, it is preferable that, for example, the angle between its major axis (longitudinal direction axis) and the separator surface is, on average, 30° or less, and more preferably 20° or less.

When using the fibrous material as a porous substrate, it is desirable to adjust the amount of other components such that the porous substrate accounts for 10 vol % or more and 90 vol % or less of the total volume of the constituent components of the separator.

The separator of the present invention may have a monolayer structure that contains at least one of the resin A and the resin B, a filler (the above-described boehmite having a secondary particle structure, etc.), an organic binder and the like, or may be a multilayer structure that includes at least two layers having different compositions of these constituent components.

In the case of the separator having a multilayer structure, it is preferable to configure it as a porous film that includes a first porous separator layer primarily containing a filler (the above-described boehmite having a secondary particle structure, etc.), an organic binder and the like and a second porous separator layer primarily containing resin A and/or resin B.

In this case, the first separator layer has separator's primary function, that is, the function for preventing short-circuiting as a result of direct contact between the positive and negative electrodes, and that function is secured by boehmite having a secondary particle structure in which primary particles are connected serving as a filler. That is, due to the first separator layer, it is possible to prevent, in a temperature range in which electrochemical devices are normally used, the occurrence of short-circuiting as a result of the positive electrode active material penetrating the separator to come into contact with the negative electrode when an electrode assembly is configured by pressing the positive electrode and the negative electrode together with the separator interposed therebetween. Also, when the electrochemical device is heated to a high temperature, the first separator layer suppresses the thermal shrinkage of the separator to maintain its shape, and it is therefore possible to prevent short-circuiting as a result of direct contact between the positive and negative electrodes that can occur when the separator shrinks due to heat.

The second separator layer is provided to secure the shutdown function. In the case where the second separator layer contains resin A, when the temperature of an electrochemical device in which the separator of the present invention is incorporated becomes the melting point of resin A or higher, the resin A melts, and closes the pores of the separator, causing a shutdown that suppresses the electrochemical reactions from proceeding. In the case where the second separator layer contains resin B, on the other hand, due to the temperature increase of an electrochemical device in which the separator of the present invention is incorporated, the resin B absorbs the electrolyte in the electrochemical device and swells, the swelled particles close the pores of the separator, and the amount of flowable electrolyte that exists within the pores of the separator is reduced, causing a shutdown.

As described above, by providing a portion that secures the separator's primary function (first separator layer) and a portion that secures the shutdown function (second separator layer) as separate layers, the two functions can be secured with a good balance, and it is therefore possible to configure an electrochemical device that is superior in reliability and safety and has good load characteristics.

In the present specification, the expression "the first separator layer primarily contains a filler" means that the filler accounts for 50 vol % or more of the total volume of the constituent components of the first separator layer (note that, when including a porous substrate, the total volume of the constituent components excluding the porous substrate).

Likewise, in the present specification, the expression "the second separator layer primarily contains resin A and/or resin B" means that the total volume of the resin A and the resin B (when including either the resin A or the resin B, the amount of the resin A or the resin B) accounts for 50 vol % or more of the total volume of the constituent components of the second separator layer (note that, when including a porous substrate, the total volume of the constituent components excluding the porous substrate).

The first separator layer primarily containing a filler may contain the resin A, the resin B, the fibrous material, other additive particles, and the like. However, because the primary aim of the first separator layer is, as described above, to secure the separator's primary function of preventing short-circuiting between the positive and negative electrodes, if the amount of filler in the first separator layer is small, it becomes difficult to secure this function. Accordingly, the amount of filler in the first separator layer preferably is 50 vol % or more of the total volume of the constituent components in the first separator layer (when including a porous substrate, the total volume of the constituent components excluding the porous substrate), more preferably 70 vol % or more, and even more preferably 80 vol % or more. Because the higher the percentage of boehmite with a secondary particle structure of the total volume of the filler in the first separator layer, the more easily the effect is exhibited, the filler amount preferably is, for example, 80 vol % or more.

The second separator layer may contain either resin A or resin B, or may contain both. It is also possible to use, as a second separator layer, a microporous film made of resin A, that is, for example, a microporous film made of polyolefin (polyethylene, polypropylene, etc.) used as a separator in conventional electrochemical devices such as lithium secondary batteries.

It is sufficient that the amount of resin A and/or resin B in the second separator layer is large, that is, as described above, the total volume of the resin A and the resin B is 50 vol % or more of the total volume of the constituent components of the second separator layer, but when the porosity of the first separator layer determined by the method described later is 10 to 50%, the total volume of the resin A and the resin B in the second separator layer preferably is 20% or more of the pore volume of first separator layer. In this case, a separator having a better shutdown function can be obtained.

The first separator layer and the second separator layer are used by being overlaid in an electrochemical device. However, the first separator layer and the second separator layer may be integrated together. Alternatively, the first separator layer and the second separator layer may be configured as independent layers without being integrated together, and when assembled into an electrochemical device, they are overlaid in the electrochemical device so as to function as a separator interposed between the positive electrode and the negative electrode. The separator of the present invention can be integrated with an electrode. When the separator is configured to include the first separator layer and the second separator layer, it is possible to employ a configuration in which the first separator layer and the second separator layer are integrated together, and after that, they may be integrated with an electrode. Alternatively, a configuration is possible in which the first separator layer and the second separator layer are integrated with different electrodes, or in which either one of the first separator layer and the second separator layer is integrated with an electrode and the other separator layer is configured as an independent film. Alternatively, it is possible to combine an independent film formed by integrating the first separator layer and the second separator layer with an electrode that has been integrated with either the first separator layer or the second separator layer. Furthermore, the first separator layer and the second separator layer are not necessarily in direct contact with each other, and another layer, for example, a fibrous material layer that constitutes a porous substrate may be interposed therebetween.

Also, the first separator layer primarily containing a filler, and the second separator layer primarily containing resin A and/or resin B are not necessarily included singularly, and a plurality of layers may be included in the separator. For example, it is possible to employ a configuration in which, for example, the second separator layers are formed on both faces of the first separator layer. However, when the separator thickness is increased by increasing the number of layers, it may cause an increase in internal resistance or a reduction in energy density. Accordingly, excessive increase in the number of layers is not preferred. The number of separator layers preferably is 5 or less.

As described above, a porous substrate can be used as the separator of the present invention. In this case, the porous substrate can be used as a second separator layer that primarily contains resin A and/or resin B, or a first separator layer that primarily contains a filler. Porous substrates can be used for both the first separator layer and the second separator layer. In this case, the first separator layer and the second separator layer may be integrated by sharing a single porous substrate, or separate porous substrates may be used for the first separator layer and the second separator layer.

When using a separator configured to include a first separator layer and a second separator layer in an electrochemical device, it is preferable to dispose the second separator layer that has the shutdown function on the negative electrode side, and more preferably, dispose the second separator layer such that it comes into contact with the negative electrode active material-containing layer. With this configuration, the shutdown function can be exhibited in a favorable manner.

From the viewpoint of further enhancing the short-circuiting prevention effect in the electrochemical device and securing the strength of the separator to achieve ease of handling, the separator preferably has a thickness of 3 µm or more, and more preferably 5 µm or more. In order to, on the other hand, further increase the energy density of the electrochemical device and improve load characteristics, the separator preferably has a thickness of 30 µm or less, and more preferably 25 µm or less, and even more preferably 20 µm or less.

When the separator of the present invention is configured to include a first separator layer and a second separator layer, the first separator layer preferably has a thickness (or the total thickness when including a plurality of first separator layers) of 2 µm or more, more preferably 4 µm or more, and preferably 30 µm or less, and more preferably 20 µm or less, and even more preferably 10 µm or less. The second separator layer preferably has a thickness (or the total thickness when including a plurality of second separator layers) of 1 µm or more, more preferably 3 µm or more, and preferably 20 µm or less, and more preferably 15 µm or less, even more preferably 10 µm or less.

The separator of the present invention preferably has, in a dry state, a porosity of 15% or more, and more preferably 20% or more in order to secure the amount of electrolyte to obtain good ion permeability. From the viewpoint of securing the strength of the separator and preventing internal short-circuiting, the separator of the present invention preferably has, in a dry state, a porosity of 70% or less, and more preferably 60% or less. The porosity P(%) of a separator can be calculated by obtaining the total sum of components i using Formula (10) given below from a separator thickness, a mass per area, and the density of a constituent component.

$$P = 100 - (\Sigma a_i / \rho_i) \times (m/t) \quad (10)$$

In the above formula, $a_i$: the ratio of component i expressed in mass %, $\rho_i$: the density of component i (g/cm$^3$), m: the mass of separator per unit area (g/cm$^2$), and t: a separator thickness (cm).

In the separator containing resin B, no problem arises even when the porosity of the separator decreases somewhat as a result of the resin B absorbing the electrolyte in an assembled battery, and it is preferable that the porosity of the separator is 10% or more.

Also, the porosity P (%) of the first separator layer can be determined using Formula (10) given above by setting m as the mass (g/cm$^2$) of the first separator layer per unit area and t as the thickness (cm) of the first separator layer in the above Formula (10). The porosity of the first separator layer determined by this method preferably is 10% or more and 60% or less, and more preferably 50% or less.

Furthermore, the porosity P (%) of the second separator layer can also be determined using Formula (10) given above by setting m as the mass (g/cm$^2$) of the second separator layer per unit area and t as the thickness (cm) of the second separator layer in the above Formula (10). The porosity of the second separator layer determined by this method preferably is 10 to 60%.

The separator of the present invention preferably has an average pore size of 0.01 µm or more, and more preferably 0.03 µm or more from the viewpoint of obtaining good ion permeability of the separator and further enhancing the load characteristics of the electrochemical device. However, when the average pore size of the separator is too large, the effect of preventing penetration by lithium dendrites to suppress internal short-circuiting of the electrochemical device may become small. Accordingly, the average pore size of the separator preferably is 0.3 µm or less, and more preferably 0.1 µm or less.

From the viewpoint of more effectively exhibiting the effect of preventing internal short-circuiting of the electrochemical device caused by lithium dendrites, the tortuosity factor of the separator preferably is 3 or more. When the tortuosity factor is too large, however, load characteristics may be reduced, and thus, the tortuosity factor preferably is 10 or less.

The average pore size and tortuosity factor of the separator are measured by methods employed in the examples described below.

It is desirable that the separator of the present invention has a Gurley value of 10 to 300 sec, the Gurley value obtained by a method in accordance with JIS P 8117 and defined as the time during which 100 mL of air permeates through a film under a pressure of 0.879 g/mm$^2$. When the air permeability is too large, the ion permeability may become small. When the air permeability is too small, on the other hand, the strength of the separator may become small. Furthermore, it is desirable that the separator has a strength of 50 g or more, the strength being a piercing strength obtained using a needle having a diameter of 1 mm. When the penetrating strength is too small, short-circuiting may occur as a result of the separator being penetrated by lithium dendrites when the dendrites are formed.

The shutdown characteristics of the separator of the present invention can be determined from, for example, a change in internal resistance of the electrochemical device with temperature. Specifically, an electrochemical device is placed in a constant temperature chamber, and a temperature at which the internal resistance of the electrochemical device rises is obtained by increasing the temperature from room temperature (25° C.) at a rate of 1° C. In this case, the internal resistance of the electrochemical device at 150° C. preferably is 5 times or more the internal resistance at room temperature (25° C.), and more preferably 10 times or more. The upper limit of the internal resistance is not limited to a specific value.

In the case where the separator of the present invention is an independent film containing resin A, the shutdown characteristics may be determined from a change in Gurley value, which is an index representing air permeability of a porous film. That is, a separator is held in a suspended state in a constant temperature chamber for a fixed time (e.g., 30 minutes), and then removed therefrom and cooled to room temperature (25° C.). In this state, Gurley value is measured. By repeating this by changing the temperature of the constant temperature chamber, shutdown characteristics can be determined from a change in Gurley value. It is desirable that the Gurley value at the time of shutdown is 5 times or more the Gurley value at room temperature (25° C.), more preferably 10 times or more, and even more preferably 30 times or more.

As will be described later, the separator of the present invention is configured such that it does not easily shrink due to heat, unlike conventional separators made of PE porous films. Particularly when a separator is configured using a porous substrate made of a highly heat resistant material, the porous substrate essentially hardly shrinks due to heat, thermal shrinkage is further suppressed.

In such a separator of the present invention, by employing each configuration described above, the heat shrinkage rate at 150° C. can be reduced to 1% or less. That is, even when the temperature of the inside of the electrochemical device reaches 150° C. or so, the separator hardly shrinks, and therefore short-circuiting due to contact between the positive and negative electrodes can be prevented, enhancing safety of the electrochemical device at high temperatures. The lower limit value of the thermal shrinkage rate is not limited to a specific value, and the closer to 0%, the more preferable. In the present specification, the term "thermal shrinkage rate at 150° C." refers to a rate of decrease in dimension expressed in percentage that is determined as follows. A separator is placed in a constant temperature chamber, the temperature is increased to 150° C., at which the separator is left for 30 minutes, and after that, the separator is removed. Then, the separator dimension is compared before and after placing the separator in the constant temperature chamber.

As a method for manufacturing the separator of the present invention, for example, the following methods (a) to (d) can be used. Through the manufacturing methods (a) to (d), separators having the above-described configuration, the above-described structure (the above-described porosity, average pore size and tortuosity factor), and the above-described characteristics (the above-described air permeability, shutdown characteristics and thermal shrinkage rate) can be manufactured.

A method (a) for manufacturing the separator of the present invention is a method in which a separator forming composition (a liquid composition such as slurry, etc.) containing a filler, an organic binder, resin A and/or resin B is applied onto a porous substrate, and then dried at a prescribed temperature. In this case, as the porous substrate, specifically, a porous sheet can be used such as a woven fabric made of at least one of the above-described fibrous materials of the component materials, or a non-woven fabric having a structure in which the fibrous materials are entangled. More specifically, examples include non-woven fabrics such as paper, PP non-woven fabric, polyester non-woven fabric (PET non-woven fabric, PEN non-woven fabric, PBT non-woven fabric, etc.), and PAN non-woven fabric.

The separator forming composition is a composition in which resin A and/or resin B (e.g., in the form of fine particles), a filler (the above-described boehmite having a secondary particle structure), an organic binder, a filler other than boehmite having a secondary particle structure (a filler in the form of plate-like particles or other forms), and the like are dispersed in a solvent (including a dispersing medium, the same applies hereinafter). The organic binder can be dissolved in a solvent.

The solvent used for the separator forming composition can be any solvent as long as it is capable of uniformly dispersing resin A, resin B, a filler, and the like, and of uniformly dissolving or dispersing an organic binder. Generally, an organic solvent is preferably used, for example, an aromatic hydrocarbon such as toluene; a furan such as tetrahydrofuran; a ketone such as methylethyl ketone or methyl isobutyl ketone; etc. For the purpose of controlling interfacial tension, an alcohol (ethylene glycol, propylene glycol, etc.), a propylene oxide-based glycol ether, such as monomethyl acetate, or the like may be added as appropriate to the solvent. In the case where the organic binder is water-soluble, is used as an emulsion, or the like, the solvent may be water. In this case as well, an alcohol (methyl alcohol, ethyl alcohol, isopropyl alcohol, ethylene glycol, etc.) may be added as appropriate to control interfacial tension.

It is preferable that, in the separator forming composition, the solid content including resin A, resin B, a filler and an organic binder is, for example, 10 to 80 mass %.

When the porous substrate has a relatively large pore opening diameter of, for example, 5 μm or more, short-circuiting is likely to be caused due to this. Accordingly, in such a case, a configuration in which all or part of resin A, resin B, a filler, plate-like particles, and the like exist within the pores of the porous substrate is preferable. In order to cause resin A, resin B, a filler, plate-like particles, and the like to exist in the porous substrate, it is possible to employ a process, for example, in which a separator forming composition containing these components is applied onto a porous substrate, and this is passed through a fixed gap to remove excess composition, and then dried.

When using plate-like particles as a filler other than boehmite having a secondary particle structure, in order to enhance the orientation to allow the function to act more effectively, a method can be used in which a separator forming composition containing the plate-like particles is applied onto a porous substrate to impregnate the substrate with the composition, and shear or a magnetic field is applied to the composition. Shear can be applied to the composition by, for example, as described above, passing a porous substrate to which a separator layer-forming composition containing plate-like particles is applied through a fixed gap.

As the porous substrate, a microporous film made of polyolefin or the like can be used instead of the porous sheet made of fibrous material. In this case, a porous layer obtained as a result of drying a separator forming composition is formed on the surface of the microporous film.

In the case of the separator configured to include a first separator layer and a second separator layer, it can be manufactured by a method in which a first separator layer-forming composition (a liquid composition such as a slurry, etc.) containing a filler, an organic binder and the like, or a second separator layer-forming composition (a liquid composition such as a slurry, etc.) containing resin A and/or resin B and the like is applied onto a porous substrate, and is dried at a prescribed temperature, and the other composition is applied and dried at a prescribed temperature. It is preferable that, in the first separator layer-forming composition, the solid content including a filler, an organic binder and the like is 10 to 80 mass %, and in the second separator layer-forming composition, the solid content including resin A and resin B is 10 to 80 mass %.

In order to more effectively exhibit the functions of the resin A, resin B and filler, it is also possible to employ a configuration in which the above components are distributed in different locations in the form of layers parallel or substantially parallel to the separator surface. To obtain this configuration, it is possible to use, for example, a method in which different compositions, for example, a first separator layer-forming composition and a second separator layer-forming composition, are applied separately onto the surface and the undersurface of a porous substrate using two die coaters or reverse roll coaters, and then dried.

When the porous substrate is a microporous film containing resin A, the microporous film itself can serve as a second separator layer, and thus it is unnecessary to apply a second separator layer-forming composition.

A method (b) for manufacturing the separator of the present invention is a method in which a first separator layer-forming composition or a second separator layer-forming composition is applied onto a porous substrate, and the other composition is applied before the applied composition dries, and then dried.

A method (c) for manufacturing the separator of the present invention is a method in which a first separator layer-forming composition is applied onto a porous substrate and dried to form a first separator layer primarily containing a filler, a second separator layer-forming composition is applied onto another porous substrate and dried to form a second separator layer primarily containing resin A and/or resin B, and the two separator layers are combined into a single separator. In this case, the first separator layer and the second separator layer may be integrated together, or a configuration is possible in which the first separator layer and the second separator layer are formed as independent layers (films), and when assembled into an electrochemical device, they are overlaid in the electrochemical device to function as a separator.

A method (d) for manufacturing the separator of the present invention is a method in which a fibrous material is added as appropriate to the separator forming composition used in the manufacturing method (a) containing a filler, an organic binder, resin A and/or resin B, the obtained composition is applied onto a substrate such a film or metal foil, dried at a prescribed temperature, and removed from the substrate. When configured to include a first separator layer and a second separator layer, a fibrous material is added as appropriate to a first separator layer-forming composition and a second separator layer-forming composition, and in the same manner as described above, the composition is applied onto a substrate such as a film or metal foil, dried at a prescribed temperature, and removed from the substrate. In the manufacturing method (d) as well, the first separator layer primarily containing a filler and the second separator layer primarily containing resin A and/or resin B may be configured as independent layers or may be combined together, as in the production method (c). When configured to integrate the first separator layer and the second separator layer, in the same manner as in the manufacturing method (a), a method in which after one separator layer is formed and dried, the other separator layer is formed may be used. Alternatively, a method in which one separator layer-forming composition is applied, and the other separator layer-forming composition is applied before that separator layer-forming composition dries may be used, or a so-called simultaneous multilayer application method may be used in which two separator layer-forming compositions are applied simultaneously.

Also, with the manufacturing method (d), a first separator layer or a second separator layer is formed on the surface of at least one of the positive electrode and the negative electrode constituting an electrochemical device, and a separator is combined with the electrode. In this case, both separator layers can be formed on at least one of the positive electrode and the negative electrode, or it is also possible to form a first separator layer on either one of the positive electrode and the negative electrode, and form a second separator layer on the other electrode.

The separator of the present invention is not limited to the structures and configurations described above. It is also possible to employ, for example, a configuration in which the manufacturing method (c) and the manufacturing method (d) are combined, that is, either one of the first separator layer and the second separator layer employs a porous substrate, and the other layer does not use a porous substrate. Alternatively, one of the first separator layer and the second separator layer is integrated with an electrode, and the other layer is configured as an independent separator layer. In this case, for example, it is possible to use a configuration in which a conventional microporous film is used as a second separator layer and a first separator layer is integrated with an electrode, and the first separator layer may be formed on the surface of the microporous film. Furthermore, resin A and resin B may individually and independently exist in the form of particles, or they may partially be fused to each other or to a fibrous material or the like.

There is no particular limitation on the electrochemical device to which the separator of the present invention is applicable as long as it employs a non-aqueous electrolyte, and it preferably is applicable to, in addition to lithium secondary batteries, applications that require safety at high temperatures such as lithium primary batteries and supercapacitors. That is, there is no particular limitation on the structure and configuration of the electrochemical device of the present invention as long as it includes the separator of the present invention, and thus it can employ various configurations and structures of conventional electrochemical devices (lithium secondary batteries, lithium primary batteries, supercapacitors, etc.) including non-aqueous electrolytes.

Hereinafter, a case of application of the present invention to a lithium secondary battery will be described as an example of an electrochemical device of the present invention. The lithium secondary battery can take any form such as a column form (prismatic form, cylindrical form, etc.) in which a steel can, an aluminum can or the like is used as an outer case can. It is also possible to use a soft package battery in which a laminated film on which a metal is deposited is used as an outer case.

As the positive electrode, there is no particular limitation as long as it is a positive electrode used in conventional lithium secondary batteries, that is, a positive electrode containing an active material capable of intercalating and deintercalating Li ions. Examples of usable positive electrode active materials include: lithium-containing transition metal oxides having a layered structure represented by $Li_{1+x}MO_2$ ($-0.1<x<0.1$, and M: Co, Ni, Mn, Al, Mg, etc.); lithium manganese oxides having a spinel structure such as $LiMn_2O_4$ and substituted $LiMn_2O_4$ in which part of the elements is substituted by another element; and olivine-type compounds represented by $LiMPO_4$ (M: Co, Ni, Mn, Fe, etc.). Specific examples of the lithium-containing transition metal oxides with a layered structure include, in addition to $LiCoO_2$ and $LiNi_{1-x}Co_{x-y}Al_yO_2$ ($0.1 \leq x \leq 0.3$, and $0.01 \leq y \leq 0.2$), and oxides containing at least Co, Ni and Mn ($LiMn_{1/3}Ni_{1/3}Co_{1/3}O_2$, $LiMn_{5/12}Ni_{5/12}Co_{1/6}O_2$, $LiMn_{3/5}Ni_{1/5}Co_{1/5}O_2$, etc.).

The positive electrode active material is combined with a carbon material such as carbon black as a conductive aid material, a fluorocarbon resin such as polyvinylidene fluoride (PVDF) as a binder, and the like, to prepare a positive electrode material mixture. With this positive electrode material mixture, for example, a positive electrode active material-containing layer is formed, for example, on a current collector.

As the positive electrode current collector, a foil, punched metal, mesh, expanded metal made of a metal such as aluminum can be used. Usually, an aluminum foil having a thickness of 10 to 30 μm is preferably used.

A positive electrode-side lead portion is usually provided by forming an exposed portion in a current collector by not forming a positive electrode active material-containing layer on a part of the current collector when producing a positive electrode. However, the lead portion is not necessarily integrated with a current collector at the time of production, and it may be provided by connecting an aluminum foil or the like to the current collector later.

As the negative electrode, there is no particular limitation as long as it is a negative electrode used in conventional lithium secondary batteries, that is, a negative electrode containing an active material capable of absorbing and desorbing Li ions. For example, as the negative electrode active material, one of or a mixture of two or more of carbon-based materials capable of intercalating and deintercalating lithium, such as graphite, pyrolytic carbon, coke, glassy carbon, fired products of organic polymer compounds, mesocarbon microbeads (MCMB) and carbon fiber, is used. It is also possible to use an element, such as Si, Sn, Ge, Bi, Sb or In, an alloy thereof, a compound capable of charging and discharging at a low voltage close to that of a lithium metal such as a lithium-containing nitride or lithium oxide, a lithium metal, or a lithium/aluminum alloy as a negative electrode active material. The negative electrode active material is combined with a conductive aid material (a carbon material such as carbon black, etc.), a binder such as PVDF, and the like as appropriate to prepare a negative electrode material mixture, and the negative electrode material mixture is formed into a shaped body (negative electrode active material-containing layer) using a current collector as a core. This is used as a negative electrode. Alternatively, as negative electrodes, foils made of the above-listed various alloys and a lithium metal can be used alone, or a laminate obtained by laminating such a foil on a current collector can be used.

When using a current collector in the negative electrode, a foil, a punched metal, a mesh, an expanded metal made of copper or nickel, and the like can be used. Usually, a copper foil is used. The negative electrode current collector preferably has an upper limit thickness of 30 μm and desirably has a lower limit thickness of 5 μm when the thickness of the negative electrode as a whole is reduced to obtain a high energy density battery. A negative electrode-side lead portion can be formed in the same manner as the positive electrode-side lead portion.

A positive electrode and a negative electrode as described above can be used in the form of a laminate obtained by laminating them with the separator of the present invention interposed therebetween, or in the form of a spirally-wound body obtained by spirally winding them with the separator of the present invention interposed therebetween.

As the electrolyte, as described above, a solution in which a lithium salt is dissolved in an organic solvent is used. There is no particular limitation on the lithium salt as long as it can dissociate in the solvent into $Li^+$ ions and does not easily cause a side reaction, such as decomposition, in a voltage range where batteries are used. Examples include: inorganic lithium salts such as $LiClO_4$, $LiPF_6$, $LiBF_4$, $LiAsF_6$ and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiCF_{2n+1}SO_3(2 \leq n \leq 5)$ and $LiN(RfOSO_2)_2$ [where Rf is a fluoroalkyl group].

There is no particular limitation on the organic solvent used in the electrolyte as long as it can dissolve the above-listed lithium salts and does not cause a side reaction, such as decomposition, in a voltage range where batteries are used. Examples include: cyclic carbonates such as ethylene carbonate, propylene carbonate, butylene carbonate and vinylene carbonate; linear carbonates such as dimethyl carbonate, diethyl carbonate and methyl ethyl carbonate; linear esters such as methyl propionate; cyclic esters such as γ-butyrolactone; linear ethers such as dimethoxyethane, diethyl ether, 1,3-dioxolane, diglyme, triglyme and tetraglyme; cyclic ethers such as dioxane, tetrahydrofuran and 2-methyltetrahydrofuran; nitriles such as acetonitrile, propionitrile and methoxy propionitrile; and sulfite esters such as ethylene glycol sulfite. These may also be used in a combination of two or more. In order to obtain a battery with good characteristics, it is desirable to use a combination that can provide a high conductivity such as a solvent mixture of an ethylene carbonate and a linear carbonate. For the purpose of improving characteristics such as safety, charge/discharge cycle property and high temperature storage property, an additive such as a vinylene carbonate, 1,3-propane sultone, diphenyl disulfide, cyclohexyl benzene, biphenyl, fluorobenzene, or t-butyl benzene can be added to the electrolyte.

It is preferable that the concentration of the lithium salt in the electrolyte is 0.5 to 1.5 mol/L, and more preferably 0.9 to 1.25 mol/L.

A positive electrode having a positive electrode active material-containing layer and a negative electrode having a negative electrode active material-containing layer as described above can be produced by, for example, applying a positive electrode active material-containing layer-forming composition (slurry, etc.) prepared by dispersing a positive electrode material mixture in a solvent such as N-methyl-2-pyrrolidone (NMP), and a negative electrode active material-containing layer-forming composition (slurry, etc.) prepared by dispersing a negative electrode material mixture in a solvent such as NMP onto current collectors, and drying the current collectors. In this case, it is possible to adopt, for example, a configuration in which an electrode and a separator are integrated by applying a positive electrode active material-containing layer-forming composition or negative electrode active material-containing layer-forming composition onto a current collector, and applying, before the composition dries, a separator forming composition. It is also possible to form an integrated body of a positive electrode and a first separator layer and/or a second separator layer by applying a positive electrode active material-containing layer-forming composition onto a current collector, and applying, before the composition dries, at least one of the first separator layer-forming composition and the second separator layer-forming composition described above. It is also possible to form an integrated body of a negative electrode and a first separator layer and/or a second separator layer by applying a negative electrode active material-containing layer-forming composition onto a current collector, and applying, before the composition dries, at least one of the first separator layer-forming composition and the second separator layer-forming composition The electrochemical device of the present invention (e.g., the above-described lithium secondary battery) can be manufactured by integrating an electrode and a separator layer as described above. Also, the electrochemical device of the present invention can be used in the same applications as conventional electrochemical devices.

Hereinafter the present invention will be described in detail with reference to examples, but it should be understood that the present invention is not limited to the following examples.

Note that the swelling degrees $B_R$ and $B_T$ of resin B in the present example are swelling degrees obtained based on the above-described Formulas (1) to (9) by the above-described methods. Also, the volume content of each component in a separator, a first separator layer and a second separator layer shown in the examples is, when a porous substrate (non-woven fabric) is used, a volume content of the total volume of all of the constituent components excluding the porous substrate. Furthermore, the melting point (melting temperature) of resin A and Tg of resin B shown in the examples are values measured in accordance with JIS K 7121 using a DSC. The porosity of a separator is a value determined based on Formula (10) given above by the above-described method, and the average pore size is a value determined by a bubble point method. The tortuosity factor of a separator was measured by the following method.

<Measurement of Tortuosity Factor>

A model cell was produced by sandwiching a separator between two stainless steel plates, and a resistance value in an electrolyte having a known conductivity was determined by an alternating current impedance method. Changes in resistance value were determined by changing the number of separators from one, two and three, and a tortuosity factor b was calculated by the below Formula (11).

$$b = (P/100) \cdot a \cdot \sigma R/D \quad (11)$$

where P: the porosity of separator (%), a: the area of separator (cm$^2$), σ: the conductivity of electrolyte (S/cm), R: the resistance per separator (Ω), and D: the thickness of separator (μm).

Manufacturing Example 1

Production of Negative Electrode

A negative electrode material mixture-containing paste was prepared by uniformly mixing 95 parts by mass of graphite as a negative electrode active material and 5 parts by mass of PVDF as a binder with NMP as a solvent. This negative electrode material mixture-containing paste was applied intermittently onto both sides of a 101 μm thick current collector made of a copper foil such that the active material application length would be 320 mm on the surface and 260 mm on the undersurface, and then dried. After that, a calendering process was performed so as to adjust the total thickness of the negative electrode material mixture layer to 142 μm, and cutting was performed so as to bring the width thereof to 45 mm. Thus, a negative electrode having a length of 330 mm and a width of 45 mm was produced. Furthermore, a tab was welded to an exposed portion of the copper foil of the negative electrode to form a lead portion.

Manufacturing Example 2

Production of Positive Electrode

A positive electrode material mixture-containing paste was prepared by uniformly mixing 85 parts by mass of LiCoO$_2$ as a positive electrode active material, 10 parts by mass of acetylene black as a conductive aid material and 5 parts by mass of PVDF as a binder with NMP as a solvent. This paste was intermittently applied onto both surfaces of a 15 μm thick aluminum foil, which would serve as a current collector, such that the active material application length would be 319 to 320 mm on the surface and 258 to 260 mm on the undersurface, and then dried. After that, a calendering process was performed so as to adjust the total thickness of the positive electrode material mixture layer to 150 μm, and cutting was performed so as to bring the width thereof to 43 mm. Thus, a positive electrode having a length of 330 mm and a width of 43 mm was produced. Furthermore, a tab was welded to an exposed portion of the aluminum foil of the positive electrode to form a lead portion.

Example 1

Production of Separator for Electrochemical Device

A liquid composition (1-A) was prepared by dispersing 1000 g of boehmite having a secondary particle structure in which primary particles were connected (average particle size: 0.6 μm, specific surface area: 15 m$^2$/g, static bulk density: 0.2 g/cm$^3$) in 1000 g of water, and adding and uniformly dispersing 120 g of SBR latex as an organic binder. The liquid composition (1-A) was combined with 2500 g of an aqueous dispersion of PE (average particle size: 1 μm, melting point: 125° C., solid content: 40%), and stirred until uniform to prepare a liquid composition (1-B). A melt blown non-woven fabric having a thickness of 15 μm and made of PP was put into and lifted from the liquid composition (1-B) to apply the liquid composition (1-B) to the non-woven fabric, and then dried, thereby obtaining a 20 μm thick porous film (separator for an electrochemical device) that contains the filler and resin A within the pores of the non-woven fabric.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 24% and the volume content of PE fine particles (resin A) was 72%.

<Production of Lithium Secondary Battery>

A spirally wound electrode assembly was produced by spirally winding the negative electrode produced in Manufacturing Example 1, the positive electrode produced in Manufacturing Example 2, and the separator for an electrochemical device. This spirally wound electrode assembly was pressed into a flat electrode assembly, and then housed in an aluminum laminate outer case. As a non-aqueous electrolyte, a solution was prepared by dissolving LiPF$_6$ at a concentration of 1.2 mol/L in a solvent mixture of ethylene carbonate and ethyl methyl carbonate mixed at a volume ratio of 1:2. This non-aqueous electrolyte was injected into the outer case, and the outer case was sealed, thereby obtaining a lithium secondary battery.

Example 2

A liquid composition (1-C) was prepared in the same manner as the liquid composition (1-B) was prepared in Example 1, except that 2500 g of an aqueous dispersion of cross-linked PMMA (average particle size: 0.1 μm, $B_R$=1.0, $B_T$=5, Tg: 85° C., solid content: 40 mass %) was used instead of the aqueous dispersion of PE. Then, a separator for an electrochemical device was produced in the same manner as in Example 1, except that the liquid composition (1-C) was used instead of liquid composition (1-B), and a lithium secondary battery was produced in the same manner as in Example 1, except that this separator for an electrochemical device was used.

The volume contents of the constituent components of the separator for an electrochemical device were calculated, taking the specific gravity of boehmite as 3.0 g/cm$^3$, the specific gravity of cross-linked PMMA as 1.2 g/cm$^3$, and the specific gravity of SBR as 0.97 g/cm$^3$. As a result, the volume content of boehmite having a secondary particle structure in which primary particles were connected was 27% and the volume content of cross-linked P fine particles (resin B) was 69%.

Example 3

A 20 μm thick first separator layer (porous film) composed of a porous layer primarily containing a filler was produced by putting a 15 μm thick wet-laid non-woven fabric made of PET into the liquid composition (1-A) prepared in Example 1, lifting it from the liquid composition for application of the liquid composition, and drying it.

The obtained porous film was put into and lifted from an aqueous dispersion (solid content: 40 mass %) [liquid composition (2-A)] of PE fine particles (average particle size: 1 μm, melting point: 110° C.) to apply the liquid composition (2-A), and then dried, thereby obtaining a separator for an electrochemical device in which a second separator layer primarily containing resin A, that is, PE fine particles was formed on the surface and the undersurface of the first separator layer. The total thickness of the second separator layer was 5 μm.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 61% and the volume content of PE fine particles (resin A) was 29%. The Gurley value at room temperature of the separator was 99 sec, and the Gurley value when cooled to room temperature after heating at 150° C. for 30 minutes was 672 sec, which was 6.8 times the Gurley value before heating.

A lithium secondary battery was produced in the same manner as in Example 1, except that the above separator for an electrochemical device was used.

Example 4

A liquid composition (1-D) was prepared by dispersing 1000 g of boehmite having a secondary particle structure in which primary particles were connected (average particle size: 2 μm, specific surface area 4 m$^2$/g) in 1000 g of water, and adding and uniformly dispersing 120 g of SBR latex as an organic binder. A separator for an electrochemical device was produced in the same manner as in Example 3, except that this liquid composition (1-D) was used instead of the liquid composition (1-A), and a lithium secondary battery was produced in the same manner as in Example 1, except that this separator for an electrochemical device was used.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 24% and the volume content of PE fine particles (resin A) was 72%.

Example 5

A liquid composition (2-B) was prepared by adding plate-like boehmite (average particle size: 1 μm, aspect ratio: 10) to the liquid composition (2-A) in an amount of 33 g relative to 1000 g of the liquid composition (2-A), and stirring them until uniform.

A separator for an electrochemical device in which a second separator layer primarily containing PE fine particles as resin A was formed on the surface and the undersurface of a first separator layer primarily containing a filler was obtained in the same manner as in Example 3, except that the liquid composition (2-B) was used instead of the liquid composition (2-A). The total thickness of the second separator layer was 5 μm.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 54% and the volume content of PE fine particles (resin A) was 28%.

A lithium secondary battery was produced in the same manner as in Example 1, except that the above separator for an electrochemical device was used.

Example 6

Second separator layers primarily containing PE fine particles as resin A, each having a thickness of 5 μm, were produced by applying an aqueous dispersion [liquid composition (2-A)] of PE fine particles on both surfaces of the negative electrode produced in Manufacturing Example 1 using a blade coater and drying it. Also, second separator layers primarily containing PE fine particles as resin A, each having a thickness of 5 μm, were formed on both surfaces of the positive electrode produced in Manufacturing Example 2.

Next, a 20 μm thick first separator layer was produced in the same manner as in Example 3, that is, by putting a 15 μm thick wet-laid non-woven fabric made of PET into the liquid composition (1-A), lifting it from the liquid composition for application of the liquid composition, and drying it.

A spirally wound electrode assembly was produced by overlaying the positive electrode having second separator layers and the negative electrode having second separator layers with the first separator layer interposed therebetween, and spirally winding them. Then, a lithium secondary battery including a separator for an electrochemical device composed of a first separator layer and a second separator layer was produced in the same manner as in Example 1, except that this spirally wound electrode assembly was used.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 47% and the volume content of PE fine particles (resin A) was 45%.

Example 7

A spirally wound electrode assembly was produced by overlaying the negative electrode produced in Manufacturing Example 1 and the positive electrode produced in Manufacturing Example 2 with the first separator layer produced in Example 6 and a PE microporous film (thickness: 9 μm) interposed therebetween, and spirally winding them. Then, a lithium secondary battery including a separator for an electrochemical device composed of the first separator layer and the second separator layer was produced in the same manner as in Example 1, except that this spirally wound electrode assembly was used. That is, the present example produced a battery in which a PE microporous film was used as a second separator layer, instead of the second separator layers formed on the surfaces of the negative electrode and the positive electrode in Example 6.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 46% and the volume content of PE (resin A) was 47%.

Example 8

Second separator layers primarily containing PE fine particles as resin A, each having a thickness of 5 μm, were formed by applying an aqueous dispersion [liquid composition (2-A)] of PE fine particles on both surfaces of the negative electrode produced in Manufacturing Example 1 using a blade coater and drying them. Also, first separator layers primarily containing a filler, each having a thickness of 15 μm, were formed by applying the liquid composition (1-A) on both surfaces of the positive electrode produced in Manufacturing Example 2 using a blade coater, and drying them.

A spirally wound electrode assembly was produced by overlaying and spirally winding the negative electrode having second separator layers and the positive electrode having first separator layers. Then, a lithium secondary battery including a separator for an electrochemical device composed of a first separator layer and a second separator layer was produced in the same manner as in Example 1, except that this spirally wound electrode assembly was used.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 65% and the volume content of PE fine particles (resin A) was 25%.

Example 9

A liquid composition (1-E) was prepared by adding 500 g of the same aqueous dispersion of cross-linked PMMA as used in Example 2 to 1000 g of the liquid composition (1-A), and stirring them until uniform. Then, a lithium secondary battery including a separator for an electrochemical device composed of a first separator layer and a second separator layer was produced in the same manner as in Example 6, except that the liquid composition (1-E) was used instead of the liquid composition (1-A).

The volume contents of the constituent components of the separator for an electrochemical device were calculated, taking the specific gravity of boehmite as 3.0 g/cm$^3$, the specific gravity of PE as 1.0 g/cm$^3$, the specific gravity of cross-linked PMMA as 1.2 g/cm$^3$, and the specific gravity of SBR as 0.97 g/cm$^3$. As a result, the volume content of boehmite having a secondary particle structure in which primary particles were connected was 26%, the volume content of PE fine particles (resin A) was 45%, and the volume content of cross-linked PMMA fine particles (resin B) was 28%.

Example 10

Second separator layers were formed on both surfaces of a negative electrode in the same manner as in Example 8. First separator layers, each having a thickness of 15 μm, were formed by applying a liquid composition (1-A) on the second separator layers on both surfaces of the negative electrode using a blade coater, and drying them.

Using the negative electrode including a first separator layer and a second separator layer and the positive electrode produced in Manufacturing Example 2, a lithium secondary battery including a separator for an electrochemical device composed of a first separator layer and a second separator layer was produced in the same manner as in Example 8.

The volume contents of the constituent components of the separator for an electrochemical device were calculated, taking the specific gravity of boehmite as 3.0 g/cm$^3$, the specific gravity of PE as 1.0 g/cm$^3$, and the specific gravity of SBR as 0.97 g/cm$^3$. As a result, the volume content of boehmite having a secondary particle structure in which primary particles were connected was 65% and the volume content of PE fine particles (resin A) was 25%.

Reference Example 1

A lithium secondary battery was produced in the same manner as in Example 3, except that only the first separator layer produced in Example 3 was used as a separator.

Comparative Example 1

A lithium secondary battery was produced in the same manner as in Reference Example 1, except that particulate alumina (average particle size: 1.5 μm) was used as a filler.

Comparative Example 2

A lithium secondary battery was produced in the same manner as in Example 3, except that plate-like boehmite (average particle size: 1 μm, aspect ratio 10) was used as a filler.

Comparative Example 3

A spirally wound electrode assembly was produced by overlaying the negative electrode produced in Manufacturing Example 1 and the positive electrode produced in Manufacturing Example 2 with a PE microporous film (thickness: 20 μm) interposed therebetween, and spirally winding them. A lithium secondary battery was produced in the same manner as in Example 1, except that this spirally wound electrode assembly was used.

The configuration of the separators for an electrochemical device produced in Examples 1 to 10, Reference Example 1, and Comparative Examples 1 to 3 is shown in Tables 1 and 2.

layer, the ratio (%) of the total volume of the resin A and the resin B of the second separator layer to the pore volume of the first separator layer defined as 100%.

TABLE 1

|  | Porous Substrate | Filler | Resin A | Resin B |
|---|---|---|---|---|
| Ex. 1 | PP non-woven fabric | Boehmite with secondary particle structure (0.6 µm) | PE fine particles | — |
| Ex. 2 | PP non-woven fabric | Boehmite with secondary particle structure (0.6 µm) | — | Cross-linked PMMA fine particles |
| Ex. 3 | PET non-woven fabric | Boehmite with secondary particle structure (0.6 µm) | PE fine particles | — |
| Ex. 4 | PET non-woven fabric | Boehmite with secondary particle structure (2 µm) | PE fine particles | — |
| Ex. 5 | PET non-woven fabric | Boehmite with secondary particle structure (0.6 µm) Plate-like boehmite (1 µm) | PE fine particles | — |
| Ex. 6 | PET non-woven fabric | Boehmite with secondary particle structure (0.6 µm) | PE fine particles | — |
| Ex. 7 | PET non-woven fabric PE microporous film | Boehmite with secondary particle structure (0.6 µm) | PE (Microporous film) | — |
| Ex. 8 | — | Boehmite with secondary particle structure (0.6 µm) | PE fine particles | — |
| Ex. 9 | PET non-woven fabric | Boehmite with secondary particle structure (0.6 µm) | PE fine particles | Cross-linked PMMA fine particles |
| Ex. 10 | — | Boehmite with secondary particle structure (0.6 µm) | PE fine particles | — |
| Ref. Ex. 1 | PET non-woven fabric | Boehmite with secondary particle structure (0.6 µm) | — | — |
| Comp. Ex. 1 | PET non-woven fabric | Particulate alumina (1.5 µm) | — | — |
| Comp. Ex. 2 | PET non-woven fabric | Plate-like boehmite (1 µm) | PE fine particles | — |
| Comp. Ex. 3 | PE microporous film | — | PE (Microporous film) | — |

In Table 1, a value enclosed in parentheses under the filler column indicates an average particle size of filler (an average particle size of secondary particles in the case of having a secondary particle structure), and the term "secondary particle structure boehmite" means boehmite having a secondary particle structure in which primary particles are connected. Likewise, the porosity values shown in Table 2 are the average value of a first separator layer and a second separator layer in the case wherein the separator for an electrochemical device includes a first separator layer and a second separator layer. "Resin volume/Pore volume" in Table 2 means, in the case of the monolayer structure separators for an electrochemical device of Examples 1 and 2, the volume ratio (%) of resin A (Example 1) or resin B (Example 2) of the separator to the pore volume of the separator defined as 100%, and, in the case of the separators for an electrochemical device of Examples 3 to 10 including a first separator layer and a second separator

TABLE 2

|  | Porosity (%) | Average pore size (µm) | Tortuosity factor | Resin volume/Pore volume (%) |
|---|---|---|---|---|
| Ex. 1 | 31 | 0.11 | 3.4 | 54 |
| Ex. 2 | 30 | 0.10 | 3.5 | 52 |
| Ex. 3 | 37 | 0.12 | 3.2 | 31 |
| Ex. 4 | 40 | 0.13 | 3.1 | 28 |
| Ex. 5 | 36 | 0.12 | 3.9 | 36 |
| Ex. 6 | 37 | 0.13 | 3.2 | 63 |
| Ex. 7 | 43 | 0.09 | 4 | 68 |
| Ex. 8 | 48 | 0.13 | 3.2 | 33 |
| Ex. 9 | 44 | 0.12 | 3.3 | 69 |
| Ex. 10 | 47 | 0.11 | 3.2 | 33 |

TABLE 2-continued

|  | Porosity (%) | Average pore size (μm) | Tortuosity factor | Resin volume/Pore volume (%) |
|---|---|---|---|---|
| Ref. Ex. 1 | 34 | 0.12 | 3.2 | — |
| Comp. Ex. 1 | 34 | 0.35 | 3.7 | — |
| Comp. Ex. 2 | 24 | 0.10 | 4.8 | — |
| Comp. Ex. 3 | 50 | 0.09 | 5.0 | — |

Each of the lithium secondary batteries of Examples 1 to 10, Reference Example 1 and Comparative Examples 1 to 3 was subjected to the following evaluation.

First, the lithium secondary batteries of Examples 1 to 10, Reference Example 1 and Comparative Examples 1 to 3 were charged and discharged under the following conditions. Constant current-constant voltage charge was performed as follows. Constant current charge was performed at a current value of 0.2 C until the battery voltage reached 4.2 V, followed by constant voltage charge at 4.2 V was performed. The total charge time for completion of charging was set to 6 hours. Discharge was performed at a discharge current of 0.2 C until the battery voltage reached 3.0 V.

Subsequently, shutdown temperature was determined for the separator of each battery by the following method. Note that the battery of Comparative Example 1 was not subjected to the following test because internal short-circuiting considered to be due to lithium dendrites occurred in the initial charge/discharge. This is presumably because the separator of the battery of Comparative Example 1 contained, as a filler, only particulate alumina and not boehmite having a secondary particle structure, so it was easier for dendrites to penetrate through the separator as compared to the separator of the present invention, causing short-circuiting.

First, the lithium secondary batteries of Examples 1 to 10, Reference Example 1, and Comparative Examples 2 and 3 were each charged under the above-described charging conditions. Then, the charged battery was placed in a constant temperature chamber, and then heated by increasing the temperature from 30° C. to 150° C. at a rate of 1° C. per minute to obtain the change of internal resistance of the battery with time. The temperature at which a resistance value 5 times or more the resistance value obtained at 30° C. was obtained was defined as a shutdown temperature. Furthermore, when the temperature reached 150° C., the temperature was maintained for 30 minutes, and battery surface temperature and battery voltage were measured. The evaluation results are shown in Table 3.

TABLE 3

|  | Shutdown Temperature (%) | Battery Surface Temperature (° C.) | Battery Voltage (V) |
|---|---|---|---|
| Ex. 1 | 127 | 155 | 3.8 |
| Ex. 2 | 130 | 157 | 3.9 |
| Ex. 3 | 113 | 156 | 3.8 |
| Ex. 4 | 113 | 157 | 3.7 |
| Ex. 5 | 127 | 155 | 4.0 |
| Ex. 6 | 114 | 156 | 3.9 |
| Ex. 7 | 138 | 155 | 3.9 |
| Ex. 8 | 126 | 154 | 3.9 |
| Ex. 9 | 128 | 155 | 3.9 |
| Ex. 10 | 125 | 156 | 3.8 |
| Ref. Ex. 1 | — | 158 | 3.7 |
| Comp. Ex. 2 | 113 | 156 | 3.8 |
| Comp. Ex. 3 | 140 | 155 | 0 |

As can be seen from Table 3, in the separators of Examples 1 to 10, the shutdown temperature falls within a range of 90 to 140° C., and it is clear that shutdown occurs in a temperature range that is appropriate to secure battery safety at high temperatures. As for the batteries of Examples 1 to 10, even when they were kept at 150° C. for 30 minutes, nothing unusual was observed such as an increase in battery surface temperature and a voltage decrease.

In the separator of Reference Example 1, shutdown did not occur because the separator contained neither resin A nor resin B for securing the shutdown function, the occurrence of internal short-circuiting due to lithium dendrites was not observed because boehmite having a secondary particle structure was used as a filler, and nothing unusual occurred such as an increase in battery surface temperature and a voltage decrease. The positive electrode produced in Example 8 is an electrode integrated with a first separator layer, and therefore effects similar to Reference Example 1 can be obtained by combining this positive electrode with a negative electrode.

In contrast, in the battery of Comparative Example 3, it is presumed that the internal resistance dropped significantly when the battery was kept at 150° C. for 30 minutes, and internal short-circuiting occurred, decreasing the battery voltage to 0 V. This is presumably due to shrinkage of the separator.

Furthermore, aside from the above test, the lithium secondary batteries of Examples 1 to 10, Reference Example 1, and Comparative Example 3 were each charged under the following conditions, charge capacity and discharge capacity were determined, and the rate of discharge capacity to charge capacity was evaluated as a charge efficiency.

Constant current-constant voltage charge was performed as follows. Constant current charge was performed at a current value of 0.2 C until the battery voltage reached 4.2 V, followed by constant voltage charge at 4.2 V was performed. The total charge time for completion of charging was set to 15 hours. The charged battery was discharged at a discharge current of 0.2 C until the battery voltage reached 3.0 V. As a result, the batteries of Examples 1 to 10 and Reference Example 1 exhibited a charge efficiency of almost 100%, as was in the battery of Comparative Example 3, and thus it was found that they can favorably serve as a battery that can suppress the formation of lithium dendrites during charge.

Furthermore, the batteries of Example 3, Comparative Examples 2 and 3 were charged under the above-described conditions. The charged battery was discharged at a discharge current of 2 C until the battery voltage reached 3.0V, and then discharge capacity was measured, and the rate of discharge capacity to the capacity at a discharge current of 0.2 C was determined as load characteristics. The results were as follows: Example 3: 90%, Comparative Example 2: 86%, and Comparative Example 3: 85%, from which it is found that improved load characteristics were obtained in Example 3, as compared to Comparative Example 2 in which plate-like boehmite was used as a filler and Comparative Example 3 in which a conventionally used microporous film was used as a separator.

The present invention may be embodied in other forms without departing from the spirit or essential characteristics thereof. The embodiments disclosed in this application are to be considered as illustrative and not restrictive. The scope of the present invention should be construed in view of the appended claims, rather than the foregoing description, and all changes that come within the meaning and range of equivalency of the claims are intended to be embraced therein.

INDUSTRIAL APPLICABILITY

According to the present invention, it is possible to provide a separator for an electrochemical device with which it is possible to configure an electrochemical device that has good reliability, good safety, and superior load characteristics, and an electrochemical device that includes the separator and that has superior reliability, superior safety and superior load characteristics. Furthermore, according to the present invention, it is possible to provide an electrode for an electrochemical device with which it is possible to configure an electrochemical device that has good reliability, good safety, and superior load characteristics, and an electrochemical device that includes the electrode and that has superior reliability, superior safety and superior load characteristics.

The invention claimed is:

1. A separator for an electrochemical device comprising a porous film including:
   a filler;
   an organic binder; and
   polyethylene,
   wherein the porous film comprises:
   a first separator layer that is porous and primarily contains the filler; and
   a second separator layer comprised of a microporous film containing polyethylene; and
   wherein the filler contains boehmite having a secondary particle structure in which primary particles having a particle size of 1/10 to 1/3 of a particle size of the secondary particle are intergrown and connected to each other; and
   wherein the boehmite having a secondary particle structure has a static bulk density of 0.1 to 0.5 g/cm$^3$.

2. The separator for an electrochemical device according to claim 1,
   wherein the filler further contains plate-like particles.

3. The separator for an electrochemical device according to claim 1,
   wherein the boehmite having a secondary particle structure accounts for 75 vol % or more of the total volume of the filler.

4. The separator for an electrochemical device according to claim 1,
   wherein the separator has a porosity of 20 to 60%.

5. The separator for an electrochemical device according to claim 1,
   wherein the separator has an average pore size of 0.01 to 0.3 µm.

6. The separator for an electrochemical device according to claim 1,
   wherein the separator has a tortuosity factor of 3 or more.

7. The separator for an electrochemical device according to claim 1,
   wherein
   the first separator layer and the second separator layer are integrated together.

8. The separator for an electrochemical device according to claim 1,
   wherein the first separator layer has a porosity of 10 to 50%, and a volume of the polyethylene contained in the second separator layer is 20% or more of the pore volume of the first separator layer.

9. The separator for an electrochemical device according to claim 1, further comprising a porous substrate having a heat resistance temperature of 150° C. or higher.

10. The separator for an electrochemical device according to claim 9,
    wherein the porous substrate is comprised of a fibrous material.

11. The separator for an electrochemical device according to claim 10,
    wherein the fibrous material is comprised of at least one selected from the group consisting of cellulose, a modified form thereof, polyolefin, polyester, polyacrylonitrile, aramid, polyamide imide, polyimide, and inorganic oxide.

12. The separator for an electrochemical device according to claim 10,
    wherein the fibrous material forms a woven fabric or non-woven fabric.

13. The separator for an electrochemical device according to claim 1,
    wherein a Gurley value after heating to 150° C. is five times or more a Gurley value before heating.

14. The separator for an electrochemical device according to claim 1,
    wherein the separator has a thickness of 30 µm or less.

15. An electrochemical device comprising a positive electrode, a negative electrode, a non-aqueous electrolyte, and a separator,
    wherein the separator comprises the separator for an electrochemical device according to claim 1.

16. An electrochemical device comprising a positive electrode, a negative electrode, a non-aqueous electrolyte, and a separator,
    wherein the separator comprises: a first separator layer that is porous and primarily contains a filler; and
    a second separator layer comprised of a microporous film primarily containing polyethylene,
    the filler includes boehmite having a secondary particle structure in which primary particles having a particle size of 1/10 to 1/3 of a particle size of the secondary particle are intergrown and connected to each other; and
    wherein the boehmite having a secondary particle structure has a static bulk density of 0.1 to 0.5 g/cm$^3$; and
    the first separator layer is integrated with the positive electrode or the negative electrode.

17. An electrochemical device comprising a positive electrode, a negative electrode, a non-aqueous electrolyte, and a separator,
    wherein the separator comprises the separator for an electrochemical device according to claim 7.

18. The electrochemical device according to claim 16, wherein the first separator layer and the second separator layer are overlaid within the electrochemical device to form the separator.

* * * * *